United States Patent [19]

Cormier et al.

[11] 4,455,605

[45] Jun. 19, 1984

[54] METHOD FOR ESTABLISHING VARIABLE PATH GROUP ASSOCIATIONS AND AFFILIATIONS BETWEEN "NON-STATIC" MP SYSTEMS AND SHARED DEVICES

[75] Inventors: Roger L. Cormier, Pleasant Valley; Robert J. Dugan, Hyde Park; Richard R. Guyette, Hopewell Junction; Paul J. Wanish; Carl Zeitler, Jr., both of Poughkeepsie, all of N.Y.

[73] Assignee: International Business Machines Corporation, Armonk, N.Y.

[21] Appl. No.: 286,396

[22] Filed: Jul. 23, 1981

[51] Int. Cl.³ .................... G06F 3/04; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,716,837 | 2/1973 | Waddel | 364/200 |
| 3,732,546 | 5/1973 | Ronkin et al. | 364/200 |
| 3,768,074 | 10/1973 | Sharp et al. | 364/200 |
| 3,787,816 | 1/1974 | Hauck et al. | 364/200 |
| 3,812,468 | 5/1974 | Wollum et al. | 364/200 |
| 3,812,469 | 5/1974 | Hauck et al. | 364/200 |
| 4,004,277 | 1/1977 | Gavril | 364/200 |
| 4,044,333 | 8/1977 | Ausburg et al. | 364/200 |
| 4,200,930 | 4/1980 | Rawlings et al. | 364/200 |
| 4,207,609 | 6/1980 | Luiz et al. | 364/200 |
| 4,373,181 | 2/1983 | Chisholm et al. | 364/200 |
| 4,396,984 | 8/1983 | Videki | 364/200 |
| 4,413,328 | 11/1983 | Videki | 364/900 |

Primary Examiner—Jerry Smith
Assistant Examiner—Jameson Lee
Attorney, Agent, or Firm—R. Lieber

[57] ABSTRACT

Multiprocessing systems having changeable CPU configurations generate unique changeable identifications (ID's). These are presented by I/O channels over various I/O connection paths, in association with special path defining commands and function data. Related path state indications are stored peripherally in path map tables and define path group associations for sustaining path-independent I/O operations. When a device is reserved via one path in a path group the reserve affiliation is extended automatically (in the path tables) to each path in the group, thereby rendering each path accessible in a reserved mode. The path defining commands are used for adding paths to, resigning paths from and disbanding groups. Special sensing commands are used for sensing path reservation and grouping states. When a command for adding or resigning a path is presented to a reserved device via one path in a group the reserve is automatically realigned to the enlarged or reduced group. When a command for disbanding a group is presented to a reserved device the reserve is realigned to apply only to the path on which the command is presented. The foregoing special commands are required to be obeyed by the device even if it currently has a conflicting allegiance to the same system or another system. Consequently, paths can be added to an established path group without requiring potentially premature release of any allegiance.

11 Claims, 11 Drawing Figures

METHOD FOR ESTABLISHING VARIABLE PATH GROUP ASSOCIATIONS AND AFFILIATIONS BETWEEN "NON-STATIC" MP SYSTEMS AND SHARED DEVICES

CROSS-REFERENCE TO RELATED APPLICATIONS

U.S. Pat. No. 4,207,609, by F. A. Luiz et al, granted June 10, 1980, relates to a method for associating I/O devices with CPU systems on a path independent basis. The present application concerns specific improvements on the method of path management disclosed in this patent.

Co-pending U.S. patent application Ser. No. 241,174, by E. R. Videki, III, filed Mar. 6, 1981 pertains to a variation of the method disclosed in the Luiz et al patent, supra.

DOCUMENTS INCORPORATED BY REFERENCE

U.S. Pat. Nos. 3,400,371 to Amdahl et al and 3,488,633 to King et al, and IBM Publications: IBM System/370 Principles of Operation GA22-7000 and IBM S/360 and S/370 I/O Interface Channel-to-Channel Unit Original Equipment Manufacturer's Information, GA22-6974, disclose details of CPU, I/O channel and I/O channel interface structures and architectural elements which are disclosed generally herein as elements of an environmental system in which the present invention is applied.

IBM Publications: GC20-1649-7, ("Introduction to IBM Direct-Access Storage Devices And Organization Methods", Pp 3-25 and 3-26), GA26-1617-3 (Reference Manual For IBM 3830 Storage Control Model 2, Pages 2, 44) and GC28-0628-2 (OS/VS2 System Program Library: Supervisor Pp 211–213), describe details of Reserve and Release command functions which are disclosed generally herein as relevant elements of the environmental system operation.

BACKGROUND OF THE INVENTION

1. Field of the Invention

This invention relates to methods of associating I/O paths in varied groupings with central processing systems and shared peripheral devices, and methods for modifying such groupings while associated devices have reserve affiliations or allegiances which normally would be capable of blocking such modifications.

2. Background Prior Art & Problems Solved by the Invention

In their U.S. Pat. No. 4,207,609 supra, Luiz et al have disclosed a method for associating varied I/O path groups with central processing units (CPUs) and shared-access devices whereby CPUs and devices can communicate on a so-called "path-independent" basis. In such communications a CPU and associated I/O channel may initiate contact with a device via one path in an associated path group, then disconnect from the device (while the device "asynchronously" performs a required task, and the channel is free to perform other unrelated tasks), thereafter reconnect, at the initiative of the device, via the same or another channel and via the same or another path in the path group, and thereafter continue to perform an operation designated during the original connection.

Commands SHID (Set Host Identity) and SNID (Sense Host ID) disclosed by Luiz et al, for respectively creating such path group associations and interrogating associational states of paths, require "unique" identification of CPUs which issue these commands. However, this poses a problem when applying these commands relative to so-called "non-static" multiprocessing (MP) systems which are dynamically configurable to incorporate variable numbers of CPUs and thereby may have time-varying identities.

The SHID command as defined by Luiz et al is useful for establishing a path group, deleting (resigning) a path from an established group, and cancelling (disbanding) an established group. But the patent does not indicate specifically how such commands may be utilized relative to devices having conflicting reserve affiliations or other "allegiances" (to other systems and/or paths) which may delay the processing of such commands (until the affiliation or allegiance has been released). In certain situations this requirement for delaying path grouping operations until affiliations or allegiances have been released may impose undesirable overhead costs (e.g. for communicating with other systems having shared access to the device).

In accordance with the method disclosed by Luiz et al path map tables constructed and referenced by device control units (CUs) indicate identities of CPUs associated with specific CU ports (i.e. paths), path groupings relative to such CPUs, and device allegiances or affiliations relative to such paths and CPUs. However, beyond the disclosure of Luiz et al there exists presently a need for allowing CUs to be able to differentiate between CPUs which can only initiate operations in a path-independent mode and CPUS which can both initiate operations and respond to device-initiated communications (e.g. "requests for reconnection", "no longer busy" status indications, and "asynchronous event" status indications) in a path-independent mode.

Luiz et al also refer to a path state sensing command SNID (Sense Host Identity) for enabling host systems to interrogate path states in respect to membership in path groups. However, there exists presently a need for enabling host system to obtain additional device/path state information which could considerably enhance the effectiveness of path group utilization.

SUMMARY OF THE INVENTION

The present invention is directed to the foregoing specific areas as an improvement over the invention disclosed and claimed by Luiz et al.

The present invention provides a method for enabling CPUs to modify path groups while an associated device and/or path has a so-called conflicting reserve affiliation or allegiance which under normal conditions would render the device inaccessible; e.g. an affiliation via a path group to a system which is currently seeking to modify the group by adding a path to it (the latter path conveying a "device busy" response to "normal" selection and data transfer commands).

The present invention also provides methods for: (1) uniquely identifying multiprocessing (MP) systems having variable CPU configurations (so-called nonstatic multiprocessing (MP) environments); (2) relating such unique system identities to path groups formed in accordance with the method described by Luiz et al; and (3) forming path group associations without requiring potentially premature release of affiliations or allegiances (i.e. without rendering the object device potentially accessible to other systems having shared access thereto while a new CPU configuration or path group is being formed).

In accordance with the present invention a system formed in a non-static MP environment must generate a time-dependent identifying (ID) function associated with the time of formation of the system. The ID also includes a CPU identity function associated with a predetermined one of the CPUs incorporated in the system. This ID is stored in the system and transmitted over each of the paths which is to be named as a path group member. The transmitted functions are stored in path map tables generally described by Luiz et al but containing certain novel entries/ parameters described herein.

The present invention requires device control units (CUs) to treat such path group defining transmissions as "special" (i.e. requires the CU to process such transmissions and update the path tables even if the device is currently inaccessible for normal command communications. This permits central systems to form and modify path group associations while designated devices have conflicting reserve affiliations or other allegiances; either to a central system other than the one presently defining a path, or to a path group which currently does not include a path on which such defining transmission is being presented.

In accordance with the Luiz et al disclosure we provide presently for using Set Host ID (SHID) commands (CCWs) to establish and modify path group associations. Such commands are useful to add a path to a group, delete a path from a group or disband a group. As an improvement over the teachings of Luiz et al we require execution of such commands even if the addressed device has a conflicting reserve affiliation or other allegiance, and we allow for novel particular realignments of such reserves or allegiances relative to modified groups formed when such commands are carried out.

When a device is reserved or selected via one path in an associated path group, the reserve affiliation or selection allegiance is automatically extended to each path in the group; thereby enabling the reserving/selecting host system to communicate with the device over any path in the group, while all other paths to the device (from the reserving system or any other system) are effectively "busied". When a SHID CCW is sent from a host system over a path to associate that path with an existing path group, and with a device currently having an allegiance or affiliation existing, the command is processed even though the path is then not yet in the group, and therefore even though the same path would in such circumstances return a device busy indication in response to other communications. For this purpose, the control unit receiving the SHID command is required to treat it as special and process it (i.e. complete the functions necessary for incorporating the path with the group) with one exception. The exception is that a busy condition may be returned if the device is immediately transferring data under its existing allegiance. When a path is thereby added to the group the allegiance is automatically realigned in the device path table to extend to the added path.

When a SHID CCW is sent over a path in a reserved group for resigning (removing) path from the group the reserve is automatically realigned to extend only to the remaining paths in the group. When a SHID CCW is sent over a path in a reserved group for disbanding the group, the command is invariably obeyed, unless the device is engaged immediately in a conflicting communication, and in this case the reserve is realigned to extend only to the path over which the disbanding command has been presented.

In accordance with the disclosure of Luiz et al, we presently contemplate peripheral storage of path map tables for distinguishing path group associations. However, we provide further for establishing in such tables three distinct path states relative to each path and device: a reset state, an ungrouped state and a grouped state. Path defining command communications relative to paths in the grouped and ungrouped states are permitted only from the system whose ID was last communicated over the respective path. Path defining communications relative to paths in the reset state are permitted from any system having access to such paths.

Paths are set to the reset state by system reset signals which affect only the paths over which they are presented, and not any other paths in associated path groups. Paths are set to the grouped state in association with a device by presentation of SHID commands addressed to the device over the respective paths. Paths can be set to the ungrouped state relative to a device in several ways; when a path is being grouped relative to another device, when a path is resigned (removed from a group), or when a group containing the path is disbanded.

In addition we provide for storage of a "system type" bit, in the path map table, relative to paths in the grouped state, which denotes the capabilities of the central (host) system currently associated with the respective path group for conducting operations in a path-independent mode. Systems associated with a "0" type bit (hereafter "type 0" systems) are capable of initiating communications relative to a device over any path in a group, but are incapable of conducting parts of such operations on different paths of a group or of handling device-initiated communications (requests for reconnection, "no longer busy" indications, or indications of asynchronous event occurrences such as disk pack changes) unless such communications are received over a particular path. On the other hand "type 1" systems (i.e. systems associated with a "type 1" bit in a path table) are capable of participating in all of the foregoing operations.

In respect to the SNID CCW defined by Luiz et al, for interrogating path-device associations, the present invention requires the interrogated device to return information to the interrogating host system indicating not only the identity of the system presently associated with the interrogated path and the state of the interrogated path (i.e. reset, ungrouped or grouped), but also indicating the state of reserve affiliation or allegiance of the interrogated device. In respect to such affiliation or allegiance such information also indicates whether the allegiance is owed to the interrogating system or to another system (which is not specifically identified). Such information is provided only relative to grouped and ungrouped paths (a "0" identity is sent relative to any "reset" path).

The foregoing and other features, objects, advantages and applications of the present invention will be better understood and appreciated by considering the following detailed description and claims.

DETAILED DESCRIPTION

Figure 1:
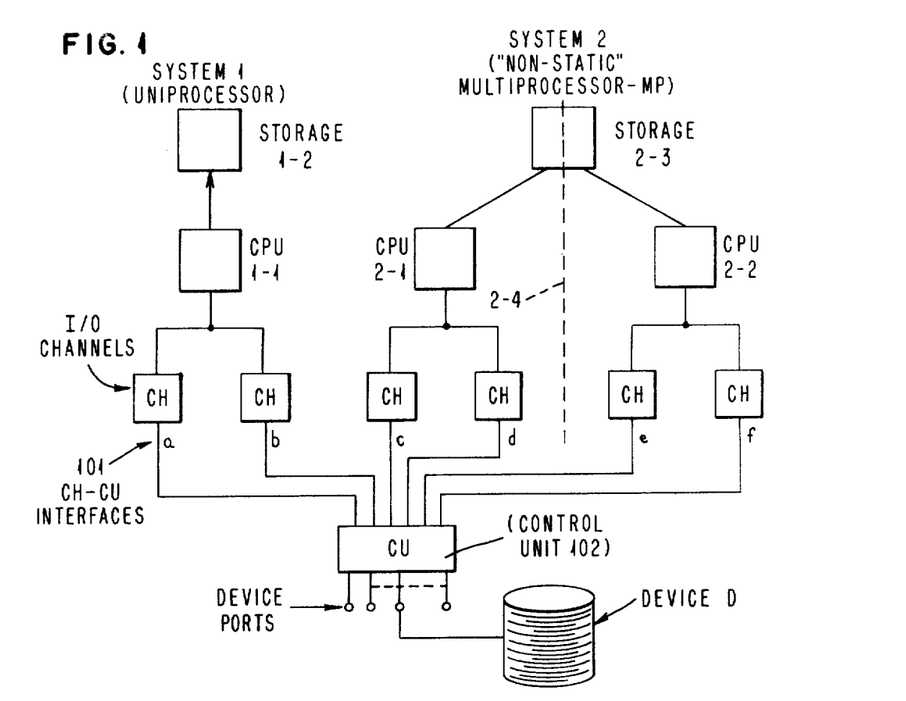
FIG. 1 illustrates an exemplary non-static network environment—of plural central processing host system complexes, common peripheral equipment and plural access paths per system—in which the subject improvement invention may be advantageously employed.

FIG. 1 exemplifies a non-static multiprocessing (MP) system network environment in which the subject invention may be advantageously used. Two central system (host) complexes are shown, denoted as "System 1" and "System 2". System 1 represents a static "uniprocessor" system containing only a single central processing unit (CPU) 1-1 having exclusive use of a main store 1-2. System 2 exemplifies a nonstatic MP system containing plural central processing units (CPUs) 2-1 and 2-2 which share a common main store 2-3.

In system 2, the dashed line 2-4 between CPUs 1-1 and 2-2 is intended to indicate that these elements may be configured at times as a unified (single) host system, sharing common areas of storage and operating under a common supervisory program, and at other times as two independent (separately supervised) systems having access only to separate areas of storage. As will be explained in more detail later, when system 2 is configured as a unified system it has one unique identity code and when it is configured as two systems each system (CPU) may have a unique identity code. It also will be understood that the present invention would be applicable to "non-static" system complexes containing more than two CPUs (in which various sets of such CPUs could be placed in unified and partitioned configurations at various times).

Each host system contains one or more I/O channels CH which connect to peripheral devices via channel-to-control unit interfaces 101 (refer to GA22-6974 supra) and control units (CUs) 102. Each channel may interface to several control units, and each control unit may link to multiple devices. For the sake of simplicity, only a single device D and six connection paths through a single control unit 102 are shown; namely paths a, b, c, d, e and f. But it will be understood that the invention could be used relative to paths extending to the device through plural control units without requiring any additional invention or experimentation. Device D is illustrated as a disk file (DASD) unit but could be any shared equipment.

In accordance with prior art practices predating Luiz et al, when device D is not reserved it may communicate with system 1 via paths a and b when such paths are accessible (one path at a time, and only one path per I/O initiating instruction). Similarly, System 2 when unified may communicate with the device over each of the paths c, d, e and f (one path per discrete host communication operation) when the device is accessible through these paths. If System 2 is partitioned, CPU 2-1 may communicate with the device over paths c and d, when the device is accessible through these paths, and CPU 2-2 may communicate with the device over paths e and f when they are accessible.

In accordance with prior art reservation procedures (refer to GC20-1649, GA26-1617 and GC28-0628 supra), System 1 may establish a reserve affiliation with device D (when the device is available) by sending a Reserve command (via a system I/O channel) over one of the paths a or b (when the path is not busy) and thereafter conduct data communications on a reserved basis over only the selected path; i.e. with System 2 excluded from access to D via any of its paths c, d, e or f (receiving busy responses to attempted communications), and System 1 excluded via the unselected one of its paths b or a. Likewise, when System 2 is unified it may set up a reserve affiliation relative to device D, via a selected one of paths c, d, e and f, when the device and path are accessible and thereafter conduct communications with the device on a reserved basis over only the selected path. Similarly, when System 2 is partitioned, CPU 2-1 may set up a reserve affiliation via one of the paths c and d, when the device is accessible through that path, and communicate with the device on a reserved basis exclusively via that path, and CPU 2-2 may do the same relative to one of the paths e and f.

In accordance with the Luiz et al disclosure, System 1 may develop a unique path group association relative to paths a and b and device D for supporting certain path-independent modes of operation relative to these paths. Such an association is formed by addressing Set Host ID (SHID) command to device D over each path (via host system channels). With this association, if CPU 1-1 reserves device D through either path, a or b, CPU 1-1 may thereafter communicate with the device on a reserved basis over either path. Likewise, if System 2 is unified its CPU's (2-1 or 2-2), operating with a single unique identity described below, may develop a unique path group association with paths c, d, e and f, or any subset of these paths, whereby upon establishment of a reserve affiliation through any path in the group the system and device may thereafter communicate on a reserved basis over any path in the group. Furthermore, when system 2 is partitioned, CPU's 2-1 and 2-2 may act independently of each other, and with different unique identities, to create path group associations relative to respective path groups c, d and e, f, thereafter operate at different times subject to the availability of the device and associated paths to create reserve affiliations relative to the device and respective path group, and then communicate with the device on a reserved basis relative to any path in the respective group.

Figure 2:
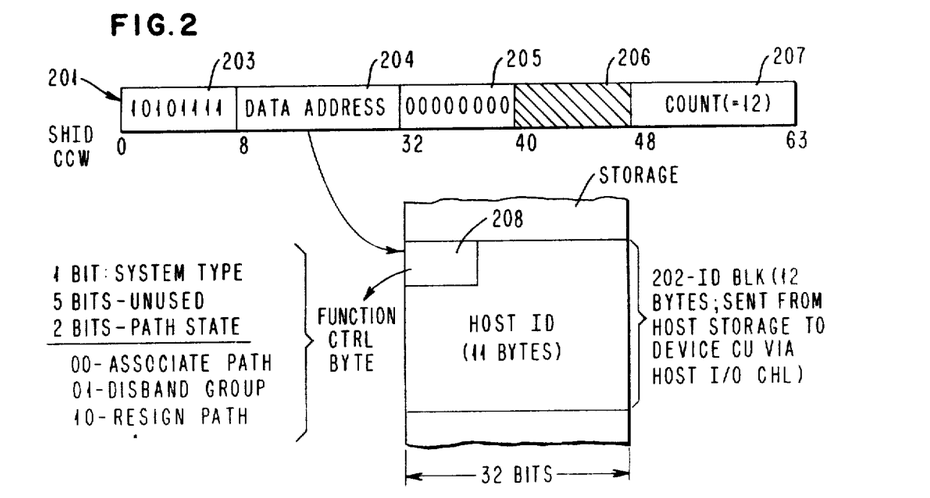
FIG. 2 illustrates the code forms and usage of a subject Set Host Identity (SHID) command, and associated function byte information and identity data.

As shown in FIG. 2, a Set Host ID (SHID) channel communication in accordance with the present invention specifically comprises an 8-byte channel command word (CCW) 201 accompanied by a 12-byte function and identity "message" 202 hereinafter termed "host ID block". The SHID CCW 201 contains an operation code byte 203 which distinguishes it from other channel commands (Read, Write, etc.), a 3-byte "data address" term 204 which defines the location (in host main storage) of the associated ID block 202, a "flag byte" 205 which for this particular command is set to all 0's, an unused byte field 206, and a 2-byte count field 207 which is always set to the value 12 and represents the byte length of the accompanying ID block 202.

The execution of this command requires communication of the operation byte 203 and ID block 202 from a host channel to a device defined by an initiating instruction (Start I/O). The ID block contains a function control byte 208 which defines one of these path state setting functions, and 11 identity information bytes which represent the identity of the respective host system. The function control byte 208 contains a host "system type" bit explained below, five spare or unused bits and two bits defining one of three path state setting functions to be performed by the device or its control unit. The three path state setting functions are: associate path and addressed device with host system (set path to grouped status relative to addressed device), resign (remove) path from group but keep association with host (i.e. set path to ungrouped status relative to addressed device), or disband (cancel) group but keep associations with host (i.e. set all paths in group to ungrouped status).

As explained previously in accordance with the present invention a path may have one of three states assigned to it by means of entries in a path table (discussed later relative to each associated device; namely, a reset state, a grouped state or an ungrouped state. Such states are created by entries in the respective device's path map table (discussed later). The reset state is established when a system reset signal is sent over the path by a host (central) system. The reset signal affects only the path(s) over which it is sent. The ungrouped state is established when a SHID command is sent over a path either resigning that path from an existing path group or disbanding the group. The grouped state is established when a SHID command is sent over a path relative to a device to associate the path with an identified host system. At the same time, if the path is linked to other devices it is set to the ungrouped state relative to such other devices.

As used hereafter the term "path group" is generally intended to refer to a group of two or more paths having a common path table association with one particular host system and one particular device. A characteristic aspect of this association is that the paths forming a path group may logically be viewed as a single path in respect to certain I/O operations; and particularly in respect to operations relative to reserved devices. When a device reserve or other allegiance is established via one path in a path group, that affiliation or allegiance is aligned via the path table with each path in the group. The host system and device may then communicate in a reserved mode via any path in the group (but not any other path). Consequently, the blocking of one path in such a group would not effectively isolate the host system from the device. Of course the reserved device would not be accessible to any other host system.

The above-mentioned system type bit, appearing in function control byte 208, differentiates between host systems having different functional capabilities for sustaining path-independent operations. Type 1 systems, represented by a type bit having a 1 value, can support piecemeal execution of an I/O operation over different paths in a group and can consistently interpret status communications sent from the device or device control unit (CU) over a grouped path chosen by the CU independent of the host system (in contemporary systems, and relative to presently described ungrouped paths, such status indications must be sent either over a predetermined path or over all paths linked to the host system). Type 0 systems, represented by type bits having 0 values, can initiate operations relative to various paths in a group, but require each such operation be conducted entirely over a single path and that grouped paths be treated the same as ungrouped paths in respect to status communications initiated by the device or associated CU.

A system representative of type 1 systems disclosed, for instance is in Clark et al U.S. Pat. No. 3,725,864. A "partially path-dependent" system representative of a type 0 system is disclosed for instance in Amdahl et al U.S. Pat. No. 3,400,371.

As described by Luiz et al, when a SHID command is presented to a device information about the status of the path which the command is presented and in certain instances other paths, is posted in a path map table associated with the device. In accordance with the present invention, in certain instances such information may establish a grouped state of the active path relative to a selected device and an ungrouped state of the same path relative to other devices linked to that path. Furthermore, such information includes a type bit, as characterized above, which is referred to by the respective CU for determining its path selections relative to grouped paths when it initiates communications with the host system.

The 11 Host ID bytes in ID block 202 (FIG. 2) contain four identifying parameters not shown in FIG. 2. These are: a 2-byte CPU address, which identifies one particular CPU in the host system (regardless of the number of CPUs such as 2-1, 2-2, etc. which that system may currently contain under unified supervision), a 3-byte CPU identification number function which is a 6-digit portion of the decimal serial number assigned to that particular CPU at the time of its manufacture, a 2-byte CPU model number function which denotes the model type of the particular CPU (e.g. 168, 3033, or 3081), and a 4-byte "time of day" (TOD) function which is associated with the time of configuration (formation) of the respective system. The TOD function is generated by sampling a portion of an instantaneous value of an 8-byte digital time of day (TOD) count. The sampled TOD portion consists of the four leftmost (i.e. highest order) bytes of the TOD count. The sample is taken and stored when the system is configured to contain the CPU which is associated with the other three ID parameters.

In operation such SHID commands are prepared in host system main storage, by programmed operations of host CPUs, and executed by host system I/O channels which are prepared by host CPUs through CPU execution of initiating instructions (e.g. Start I/O). When executing a SHID command the channel retrieves the command and associated ID block and sends them to a specified device (selected during channel initiation) over a path specified by the initiating instruction. SHID commands may not be chained, and therefore each execution of a SHID command is associated with host CPU execution of a separate initiating instruction. When a device CU receives a SHID ID block containing a function byte which specifies an "associate path"

function it creates path table entries described later, relative to the selected path and addressed/selected device, which define a grouped state for that path relative to the same device. If the same path is linked to other devices, other entries are made relative to the same path and the other devices which effectively establish ungrouped states for the same path relative to the other devices.

When identical SHID commands with "associate" function bytes are addressed to a selected device over several different paths (usually at different times and possibly through different channels) the several paths are set to grouped states relative to the selected device and thereby are associated as a path group. Operations may thereafter be conducted on a path-independent basis, or a semi-path-independent basis, relative to that path group and device (depending on the type bit value set into the path table). Furthermore, as described hereafter, if the device is thereafter reserved through one path in the group entries are posted in the path table effectively reserving all paths in the group, and thereafter the host system may communicate with the device in a reserved mode over each path in the group.

If a SHID command having an associated function byte specifying a path resigning function is directed to a device via a path in an established path group an entry would be posted in the path table which would set that path to the ungrouped state (relative to the device) and thereby effectively remove the path from the group. As noted later, if the device (and path group) had been reserved when the path resigning command was sent an additional table entry would have been made to effectively release the resigned path (and only that path) from the reserve affiliation.

If a SHID command having an associated function byte specifying a group disbanding function were to be directed to a device over a path in a path group entries would be posted in the path table setting all paths in the group to ungrouped states (relative to the device) and thereby end the group association. As noted later, if the group and device had been reserved when the disbanding command was sent the path table would have been additionally modified to remove the reserve affiliation from each path in the group other than the path on which the command was sent; thereby leaving the device and (only) that path in a reserved condition.

Figure 3:
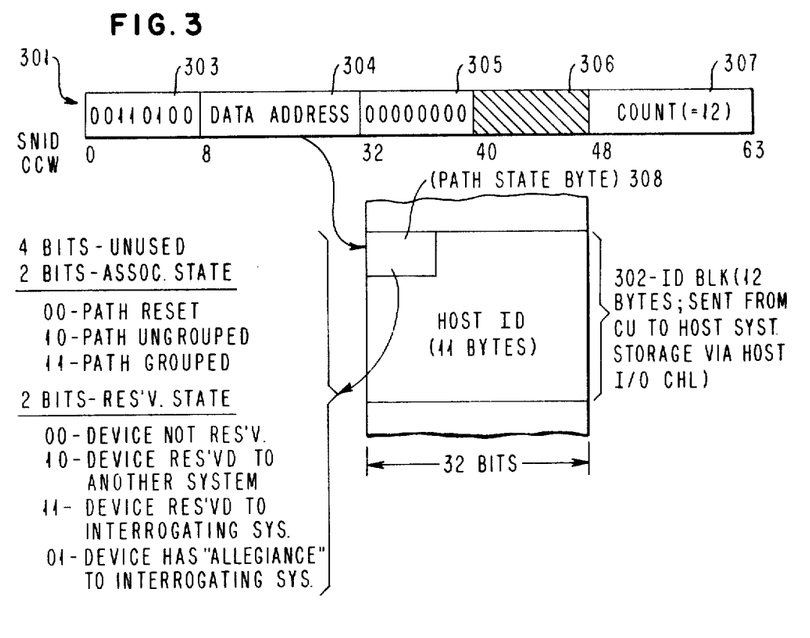
FIG. 3 illustrates the code forms and usage of a subject Sense Host ID (SNID) command, and associated status byte information and identity data.

The subject Sense Host Identity (SNID) command communication, shown in FIG. 3, has a format similar to the SHID command of FIG. 2. It includes an 8-byte CCW expression 301 which defines a location for storing an associated 12-byte Host ID block 302. However, when this command is executed the block 302 is assembled by the CU, from a path table and sent to the host system/channel for storage at the CCW data address (whereas the SHID ID block is sent from the host system to the device). Furthermore, the first byte 308 in block 302 contains unique path status information which is quite different from the information provided in function byte 208.

The SNID CCW 301 includes an operation code byte 303, the value of which is distinctively different from the operation code bytes of SHID CCW's and other CCW's (Read, Write, etc.), and data address, flag and count portions 304-307 which have forms and functions similar to respective portions 204-207 of the SHID command. However, address 304 defines a location in which ID block 302 is to be stored whereas address 204 defines the address from which ID block 202 is to be retrieved.

ID block 302 contains a unique "path state byte" 308 and 11 identity bytes, the latter serving to identify the currently associated host. If the path is reset the 11 identity bytes are all zeroes. If the identity is not zero the identity bytes include four portions corresponding to the identity portions of SHID block 202.

The Path State Byte 308 contains 4 informational bits and 4 unused bits. The informational bits comprise two bits which indicate an "associational" state of the path over which the command is sent (reset, grouped or ungrouped) and two bits which indicate one of four reservational states relative to the interrogated device (device not reserved, device reserved to the interrogating host system, device reserved to another (unidentified) host, or device and path have a "short term allegiance" to the interrogating host) (an allegiance is generally associated with one I/O operation process whereas a reserve is established and terminated by commands and may span multiple I/O operations; an allegiance may for instance span a single record search and data transfer operation whereas a reserve may span many such operations). Practical applications of this SNID command will be discussed later.

An important aspect of the present invention is that device CUs responsive to the subject SHID and SNID commands are required to fully process these commands when they are presented, even if the designated device is reserved to the system issuing the command via a path group which does not include the path on which the command is being presented. An exception is that a busy response is permitted if the device is currently exchanging data with the reserving host system. A host system may thereby add a reserved path group (and extend the reserve to the added path) without requiring a (potentially premature) release or resetting of the reserve. This may be important because when a reserve is released or reset the device becomes potentially accessible to other host systems (if it is shared by other systems) and the resulting contention may adversely impact the productivity of the system previously controlling the device and create other problems in respect to integrity of data stored at the device.

Certain contemporary systems address the foregoing problem (of contention for device access after a "premature" resetting of a reserve) by requiring that other systems having access to the device be quiesced before the resetting (refer to U.S. patent application Ser. No. 151,048, by B. Cope et al, filed May 19, 1980 as a continuation of an earlier application Ser. No. 860,813, filed Dec. 15, 1977). However, such quiescing invokes a burden of additional "overhead" operational expenses (for communicating between systems) which the present invention avoids.

Figure 4:
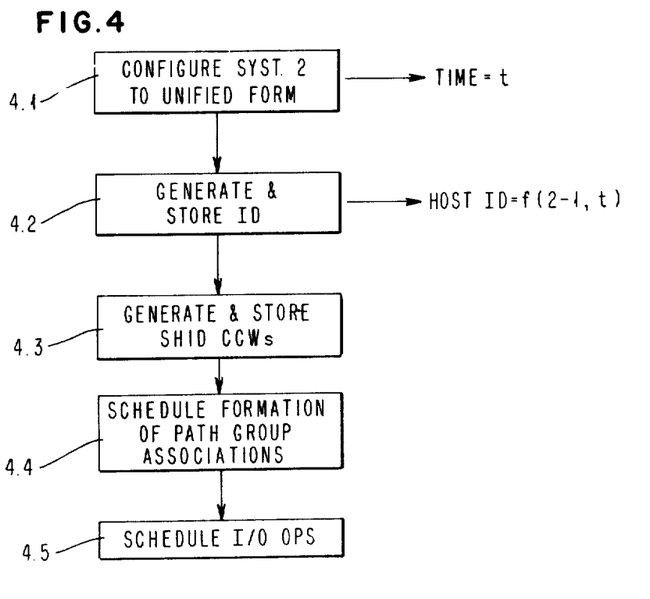
FIG. 4 illustrates host (central) system operations for establishing time-dependent host identity (ID) functions and path group associations.

FIG. 4 illustrates path grouping operations in a non-static host central system such as system 2. This forms its own time-dependent ID (identity) which it uses in association with SHID and SNID commands to form and sense path group associations and thereby sustain path-independent operations. As illustrated at 4.1, at an arbitrary time t system 2 may configure itself to a unified form incorporating CPUs 2-1 and 2-2. As suggested at 4.2 the unified system may generate and store an ID function f (2-1, t) which is a function of the identity of CPU 2-1 and the time t. A representation of this ID function may be stored with a function byte such as 308

(FIG. 1), in a main storage location accessible to I/O channels, for supporting path grouping operations.

As suggested at 4.3 the system may then prepare for path group formation by generating and storing SHID CCWs having address pointers to the function byte and ID. As shown at 4.4 the system schedules formation of path group associations (by preparing I/O initiating instructions which designate these CCWs) relative to specific devices. The function byte in this particular case would have an "associate path" function and thereby be useful for creating grouped path states relative to paths designated by the respective I/O initiating instructions.

Finally, as shown at 4.5 the system may schedule I/O operations relative to the grouped paths. Not shown in FIG. 4 but relevant to the present discussion are systems actions, discussed later in reference to FIG. 6 hereafter, for modifying path groups; using SHID commands containing function bytes which specify path resignation and group disbanding functions.

Figure 5:
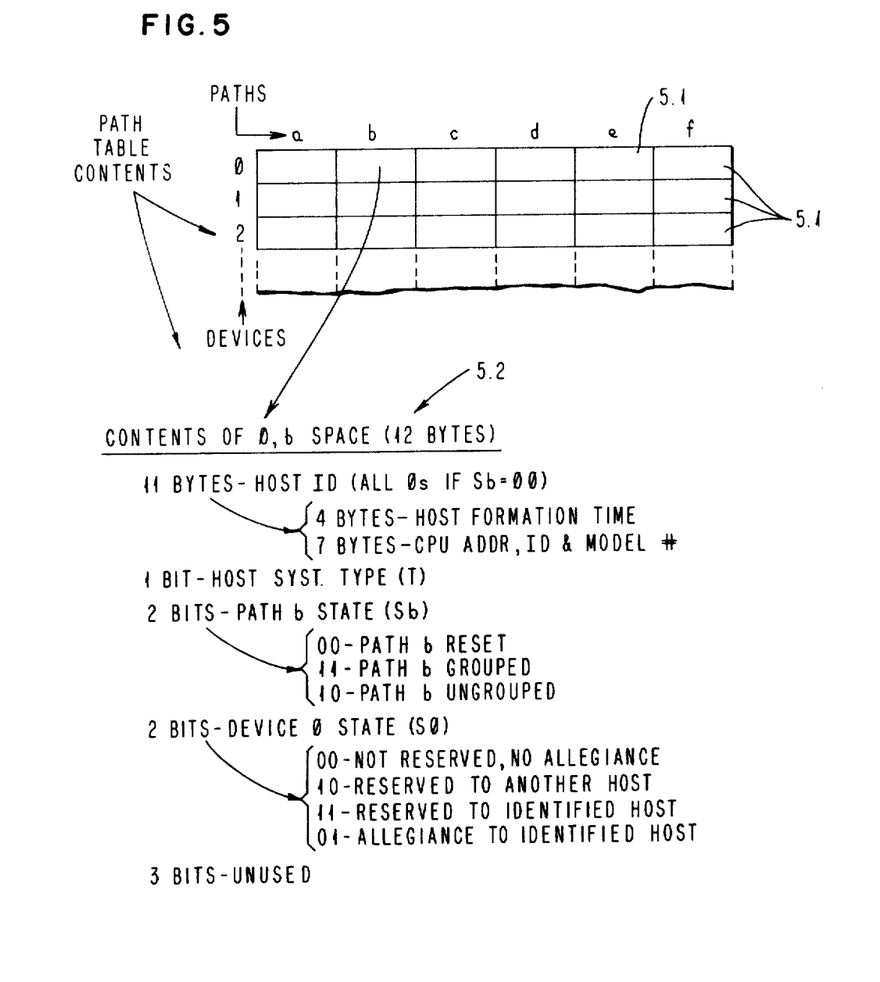
FIG. 5 illustrates content of a path map table formed in accordance with the present invention.
Figure 6:
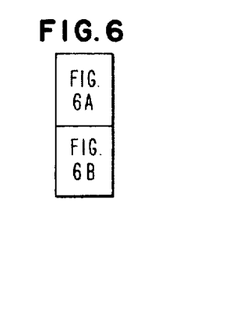
FIGS. 6A and 6B, arranged as shown in FIG. 6 illustrate formation and usage of path group and device reserve associations in accordance with the present invention.
Figure 6A:
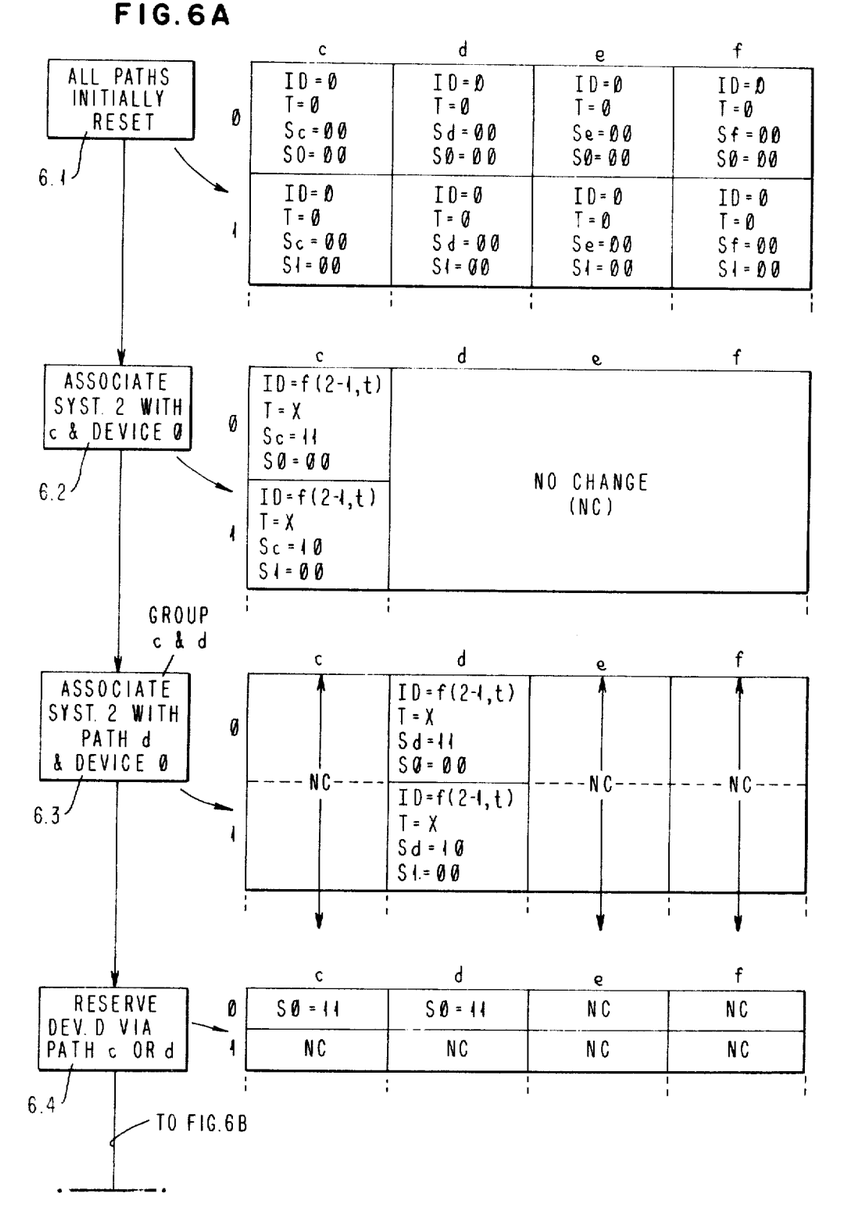
Figure 6B:
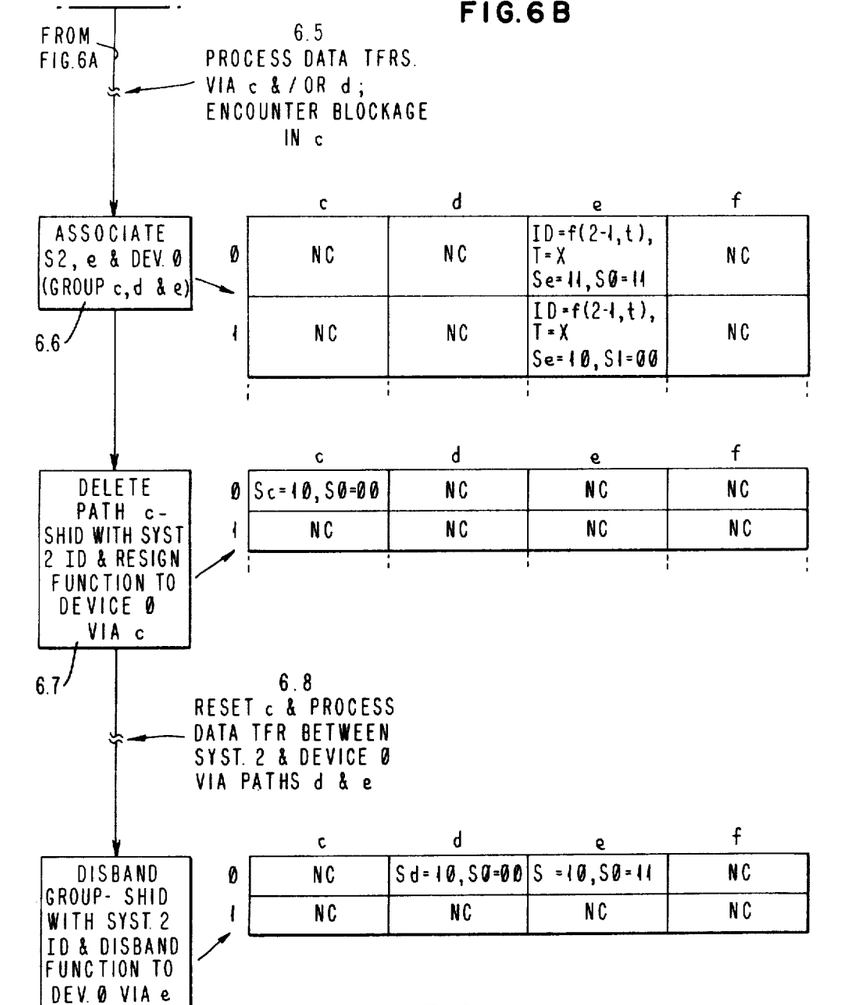

FIG. 5 illustrates the organization of a path table constructed in accordance with the present invention and FIGS. 6A and 6B when arranged as shown in FIG. 6, illustrate how parameters of this table are varied in accordance with subject SHID commands and function bytes 208 (FIG. 2).

As shown in FIG. 5, the table contains a plurality of state recording spaces 5.1 for indicating states of paths a, b, . . . ,f (see FIG. 1) relative to a plurality of devices 0, 1, 2, . . . connecting to each path. These devices may include the device D illustrated in FIG. 1. The form of information in a typical space associated with path b and device 0 is illustrated at 5.2 in FIG. 5. From this illustration the content of each of the spaces 5.1 is readily inferred.

As shown at 5.2, each space in the path table contains capacity for storage of 12 information bytes; 11 bytes for identifying a host system associated with the respective path and device, and a 12th byte for defining the host system type (T), the respective path grouping state (Sb) and the respective device reservation state (S0). The 12th byte may also contain 3 unused (or spare) bits as shown.

A typical sequence of system operation—illustrative of path group formation, device reservation, path usage, and path group modification without release of an existing reservation, is shown in FIGS. 6A and 6B, these figures being arranged vertically contiguous as shown in FIG. 6. In FIGS. 6A and 6B, actions taken relative to any device and path are indicated in boxes at the left and associated or resulting path table conditions are shown at the right.

At 6.1, all paths are assumed to be initially in the reset state (Sa=Sb=Sc= . . . =∅∅). Since system 6 is directed to actions relative to system 2 (FIG. 1) only the states of paths c, d, e and f are shown at the right. For the following discussion it is assumed that system 2 has a unified configuration (includes CPU's 2-1 and 2-2 under common program supervision).

As indicated in the table to the right of box 6.1, ID portions of the path table spaces for each of the paths c through f will contain all zeros, the type bits will initially be reset to zero, the state bits (Sc, Sd, Se, Sf) will all be zeros, and the device reservation state bits (S0, S1, . . . ) will all be zeros.

At 6.2 the action of associating of system 2 with path c and device 0 is illustrated. For this purpose, the host system transmits a SHID CCW relative to device 0 on path c, accompanied by system 2 identity f(2-1, t) and a function control byte 208 (FIG. 2) defining an "associate path" function. For this action device zero is preselected by the initiating instruction preceding execution of the command (recall that each SHID execution by a channel is preceded by CPU execution of an initiating instruction, and SHID commands cannot be chained to other commands). As shown to the right of box 6.2, this action affects path c (the absence of change in the states of other paths d, e and f being indicated by the notation NC, for "no change"). Relative to path c the table indicates that the host identity space for each device now includes the identity function f (2-1, t) sent by means of the SHID command. The system type bit T equals either 0 or 1 depending upon the system type of system 2 (which is not relevant to the present discussion, but will be discussed later). The same identity and type bit functions are stored relative to each of the devices (0, 1, . . . ) linked to the designated path c. The path state bits Sc associated with path c are set to the grouped state relative to device 0 (Sc=11) and to the ungrouped state relative to all other devices, 1, 2, . . . (Sc=10). The device reservation state bits associated with path c (S0, S1, . . . ) all remain unchanged at 00.

At 6.3 path d is associated with system 2 and device 0, thereby forming a path group relative to device zero consisting of paths c and d. This is accomplished by transmission of a SHID command accompanied by the identity of system 2 (f(2-1,t) and a function byte defining an "associate path" function. Corresponding path table changes, shown to the right of box 6.3, include the identity and type of system 2 in each space path d associated with path d. Furthermore, the state associated with device ∅ is set to grouped (Sd=11) and the corresponding path states relative to other devices 1, 2, . . . , are set to ungrouped (Sd=1∅). All other path table conditions remain unchanged. Since paths c and d are now both in grouped state relative to device ∅ the two paths constitute a path group and are useful on a path-independent basis relative to device 0, i.e. at this point system 2 could, if desired (and if it were a type 1 system) exchange data and status with device 0 on a path-independent basis. However, in this case since the device is not reserved to system 2, system 2 would encounter possible contention with other systems. Should such contention be intolerable system 2 would next attempt to reserve the device as indicated at 6.4.

At 6.4 system 2 reserves device 0 relative to the path group consisting of paths c and d. This is accomplished by transmitting a reserve command, presently well known in the art (refer for instance to IBM publications GC20-1649 "Introduction to IBM direct-access Storage Devices And Organization Methods" pages 3-25 and 3-26, GA26-1617 "Reference Manual for IBM 3830 Storage Control Model 2" pages 2, 44, and GC28-0628 "OS/VS 2 System Program Library: Supervisor" pages 211-213). As suggested to the right of box 6.4 the respective path table is modified only relative to spaces associated with device 0 and the grouped paths c and d and such modification consists in varying only the device reservation state bits in these spaces (S∅) from 00 to 11. This effectively associates the reserved state of device ∅ with both paths c and d.

At 6.5, actions of processing data transfers between system 2 and device ∅ via reserved path c and/or path d, are suggested. Thus, the host system 2 might attempt to add an additional path e to the group c, d, as shown at 6.6; either as a result of encountering a blockage in one of the paths e.g. path c or to fulfill a requirement for forming a path group containing 3 paths. Another possibility, not illustrated in FIG. 6A is that prior to actions 6.5 the system could have attempted to add path e to the group, and failed because of a busy channel condition relative to CPU 2-2. In either case the action 6.6 would proceed as shown. Addition of path 3 to the group would be accomplished by transmission of a SHID command accompanied by the system 2 identity f(2-1, t) and a function byte defining an "associate path". As indicated to the right of box 6.6 the path table is modified only relative to path e and the modifications consist of insertion of the system 2 identity and type functions (relative to each device linked to path e, and changes made relative to the path state bits (Se) and device reservation state bits (S0, S1, . . . ) as follows. The path state bits are set to the grouped state (Se=11) relative to device 0 and to the ungrouped state (Se=10) relative to all other devices. The device reservation state bits are set to the "reserved to system 2" state (11) relative to device 0.

Assume next that a blockage had been encountered in path c (refer to the indicated action at 6.5) it would then be desirable after action 6.6 to delete path c from the group, and thereafter reset that path, thereby avoiding having to alter the grouped and reserved relationships of the other paths d and e (or quiesce other systems capable of contending for access to device 0). These actions are indicated at 6.7 and 6.8 in the continuation FIG. 6b. The deletion of path c is accomplished by transmitting an SHID command to device 0 on path c with the appropriate system 2 identity and system 2 type bit and with a function byte defining a path resigning function. The effect on the path table, indicated to the right of box 6.7, is that the path state bits for path c and device 0 are changed to the ungrouped condition 10 and the reserve state bit in the same space are changed to the unreserved condition 00.

At some later point in system operation it might be desirable to disband the group, which now consists of paths d and e, without relinguishing the reserve. As shown at 6.9, this is accomplished by transmission of a SHID command with the identity of system 2 and a function byte specifying a group disbanding operation over a particular one of the paths (in this case) in the group with device 0 preselected (by the initiating instruction). In this case the path table changes, indicated to the right of box 6.9, would include setting ungrouped path state conditions relative to paths d and e (Sd=Se=10), and altering the reserve state bits relative to path d to indicate an unreserved condition (S0=00). The reserve bits relative to path e remain set in the reserve state condition 11 with the effect that the reserve initially established via path c or d has now been shifted to path 3. Note, therefore, that this process can be used to shift path reserve conditions between paths (by adding a path to a group and disbanding the group via a SHID signal over the added path); and note also that in the present example if the command has been sent over path d, rather than path e, the path table modifications would have left device 0 reserved relative to path d and unreserved relative to path e.

Figure 7:
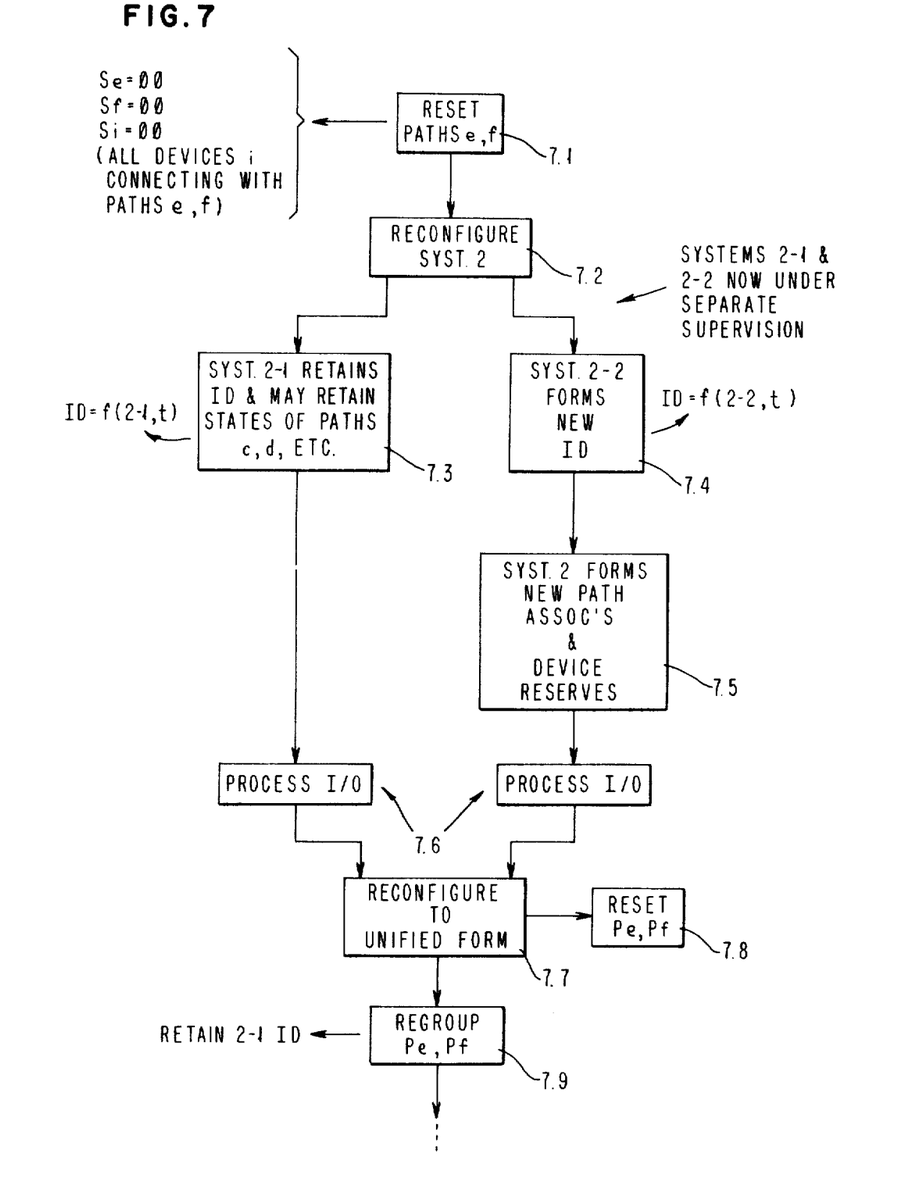
FIG. 7 illustrates central system reconfiguration and associated path group reformation operations in accordance with the present invention.

FIG. 7 illustrates various aspects of path group construction relative to a changing host system in a non-static MP environment. At 7.1, paths e and f are reset prior to a partitioning reconfiguration of system 2 indicated at 7.2. At 7.3, system 2-1 retains the identity of the unified system (f(2-1,t), while system 2-2, operating under a separate supervisory program, generates a new identity which is a function of the identity of CPU 2-2 and a new time factor t'. At 7.5, system 2 proceeds to form new path grouping associations and device reserve associations, and at 7.6 both systems independently process I/O functions.

At 7.7, the systems reconfigure to the unified form, this time retaining the common identify of system 2-1. In connection with this reconfiguration, as suggested at 7.8, paths e and f are reset and then regrouped at 7.9 in association with the paths c and d currently associated with system 2-1.

Figure 8:
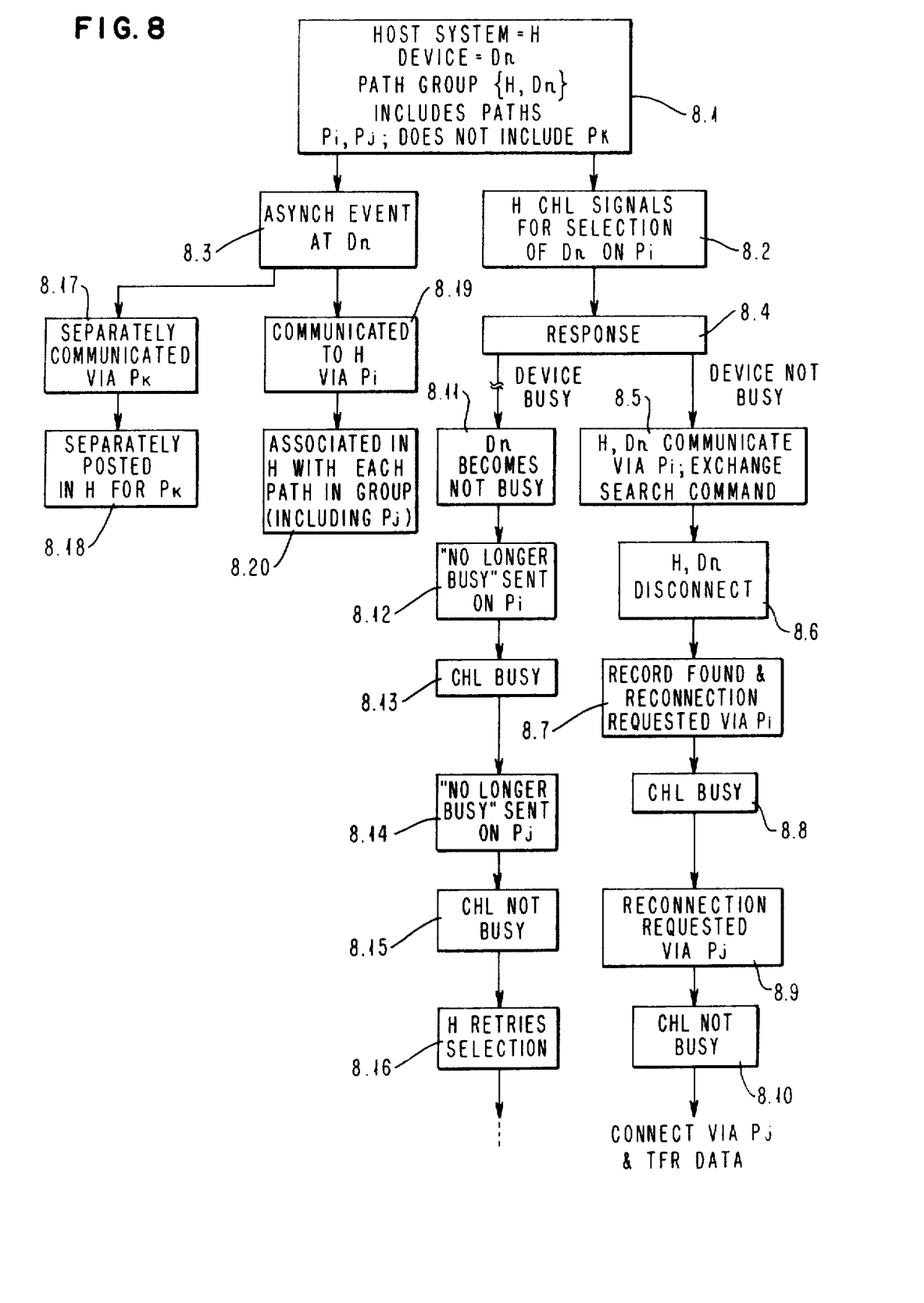
FIG. 8 illustrates path-independent operations of a type 1 system and associated device relative to an associated path group, in accordance with the present invention.

FIG. 8 illustrates path-independent operations, in accordance with the present invention relative to a type 1 host Central Processing System. The path usage restrictions relative to type 0 systems will be contrasted and understood from the following description of type 1 usage.

As shown at 8.1, a host system H and device Dn have an associated path group which include paths Pi and Pj but does not include the connecting path Pk. At 8.2 host H initiates selection of device Dn via path Pi, whereas at 8.3, which will be discussed later, Dn initiates communication with H, via various paths for reporting an "asynchronous even Occurrence (e.g. a manual disk pack change).

Considering first actions initiated at 8.2, sequences for device busy and device not busy responses begin at 8.4. When the devices respond not busy a connection is made at 8.5 enabling H and Dn to exchange command information via a host channel; e.g. for conducting a record search. H and Dn then disconnect at 8.6 while the search is conducted. At 8.7, Dn has located the record and requests reconnection via path Pi. However, in this case, it is assumed that a channel busy condition is encountered as suggested at 8.8. Using the path table for Dn the associated CU sends the reconnection request via alternate grouped path Pj, and another host channel, as suggested at 8.9. In this case it is assumed that the alternate path is not busy, as shown at 8.10. Therefore, the connection is made via that path and the record is transferred via that path.

Considering next the device busy response at 8.4, assumed that at some later point in time the device becomes not busy as suggested at 8.11. In accordance with conventional practice the device and associated CU would present "no longer busy" status to the H system channel via Pi as suggested at 8.12. In this case, however, it is assumed that the H system channel connecting with Pi is busy as shown at 8.13. Accordingly the CU consults the path table, selects alternate grouped path Pj and sends the "no longer busy" indication via Pj (an another H channel) as suggested at 8.14. Assuming that this alternate path is not busy, H receives and responds to the no longer busy status communication, and as suggested at 8.16 repeats the device selection process blocked at 8.2.

Consider next the asynchronous event communication starting at 8.3. In accordance with conventional practices, such events ordinarily must be communicated to each host system associated with the device via each path connecting the respective system with the device, in order to ensure that the occurence of the event is properly recorded relative to each path in each host system such as h.

A separate communication of this kind relative to ungrouped path Pk is indicated at 8.17 and a corresponding host operation relative to that communication is suggested at 8.18. However, for the path group which contains paths Pi and Pj (and possibly other paths) a single communication via Pi, suggested at 8.19, is sufficient to induce the host system to associate the event occurrence with each path in the group (in its path tables) as suggested at 8.20 (it should be understood that the host system contains stored path tables for scheduling its I/O operations).

Figure 9:
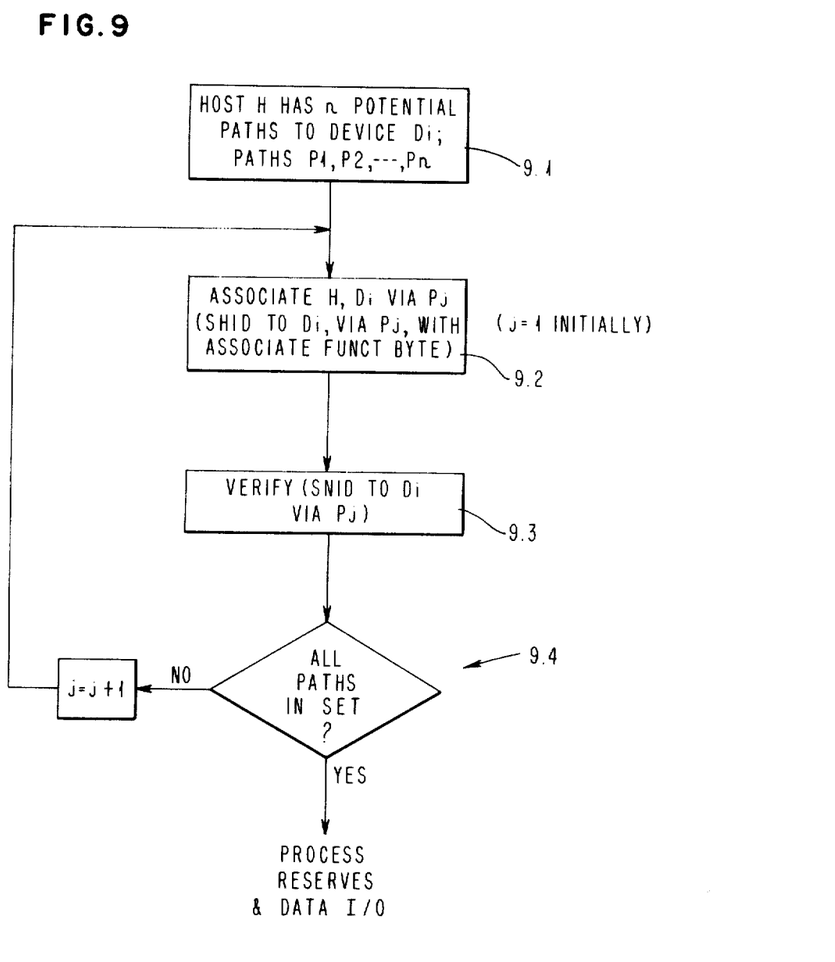
FIG. 9 illustrates usage of SNID (SENSE HOST ID) commands in accordance with the present invention.

An example of the usage of subject SNID commands is given in FIG. 9. Other applications will be apparent. Assume that host H has n paths for connecting to specific device Di; paths P1, P2, . . . , Pn as shown at 9.1. At 9.2 H communicates with Di via path Pj to establish a grouped state for that path. At 9.3, H uses a SNID command to verify that path state. At 9.4 H determines whether additional paths are to be added to the group, and if so, repeats the steps 9.2 and 9.3 for another path Pj.

Obviously, the host can proceed after any stage of this process to establish a reserve relative to Di and/or to transfer data relative to Di. Of course, H may verify the reserved status of the device, relative to any specific path in the group, by simply transmitting a SNID command over the respective path.

While we have illustrated and described preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by letters patent is:

1. A method for conducting path-independent data communications between a central processing (host) system and an I/O device through various I/O circuit paths, comprising:
   establishing a path group comprising a plurality of said paths, said host system and said device, and thereafter extending any reserve affiliation or other allegiance thereafter established between said host system, said device, and one path in the group, to each path in the group;
   establishing a reserve affiliation or other allegiance over one path in said group and thereby causing said affiliation or allegiance to extend to each path in said group;
   conducting data communications over various paths in said group while said reserve affiliation or other allegiance is in effect;
   modifying said path group while said reserve affiliation or other allegiance is in effect by transmitting a signal over a path that is not in said group but inhibiting the modifying step if the device is transmitting data on one of the paths of the group; said modifying step including one of the steps of disbanding the path group, adding a path to the group, and resigning a path from the group,
   realigning said reserve or other allegiance in a predetermined manner relative to a modified group; said realigning step including one of the steps of applying reserve affiliation or other allegiance only to the one path on which said disbanding step has been conducted, extending said reserve affiliation or other allegiance to each path included in said modified group, and removing said reserve affiliation or other allegiance from any path which may have been deleted from said original group, and conducting data communications over one or more paths in said modified group while said realigned affiliation or allegiance is in effect.

2. The method of communication of claim 1 for use in an environment wherein said host system comprises a dynamically variable configuration of central processing units having various paths for connecting to said device said CPUs operating under common supervision, and wherein said path group association is formed by storing a path map table for said device, said path map table containing a unique identification of said host system associatable with each path in said group an improved method of forming said path group association comprising:
   establishing having a given CPU configuration for said host system;
   generating a unique identity factor for said host system comprising a time of data (TOD) factor which is associated with the time of establishing said system, and a CPU ID factor representing the identity of a predetermined one of the CPUs in said given configuration;
   storing said identity factor in said system in executing a channel command which defines a path group forming operation;
   transmitting said command repeatedly from said host system to said device, over a plurality of different paths to be constituted as an associated path group; and
   storing said identity factor in said device path map table in association with path status indications denoting a unique group relationship between said plurality of paths, said system and said device.

3. The path group forming method of claim 4 comprising:
   establishing a reserve affiliation or allegiance between said established host system and device over a path in said group;
   causing said path map table to be modified to effectively extend said affiliation or allegiance to each path in said group;
   conducting data communications between said system and device over various paths in said group while said affiliation or allegiance is in effect;
   reconfiguring said system to contain an additional CPU;
   transmitting said command and identity factor relative to one or more paths associated with said additional CPU, to add the latter one or more paths to said path group while retaining said affiliation or allegiance relative to the paths in said path group and extending said affiliation or allegiance automatically to said additional paths.

4. A method of path-independent data communication in accordance with claim 1 wherein:
   said path group modifying step comprises adding a new path to said group, and is accomplished by:
   sending a special path group defining command over a path currently not in said group; said command requiring the addition of said path as a new member of said group notwithstanding that said device currently has an allegiance only to the original paths in said group and thereby normally would appear to be busy relative to said new path; and
   causing said new path to be added to said group in response to said command, and thereby causing said affiliation or allegiance to be extended to said new path, without requiring that said affiliation or allegiance first be relinquished relative to any other path in said group.

5. A method of path of path-independent data communication in accordance with claim 1 comprising:
- in association with the establishment of said path group, transmitting a bit signal from said host system characterizing said system as either a type 0 or type 1 system; wherein a type 0 system is a system which is capable of operating on a path-independent basis only when initiating communications to a device, and a type 1 system is capable of operating on a path-independent basis relative to both system-initiated and device-initiated reconnection requests and status communications;
- storing a bit representing said type 0 or 1 system characterization in a path map table associated with said device for each path in said path group; and
- making reconnection requests and status communications by said device relative to any type 0 system and a path in a path group only over predetermined paths in the group but making reconnection requests and status communications relative to any type 1 system over any path in a path group.

6. A method of communication in accordance with claim 1 comprising:
- transmitting a command from said host system to said device, over one path in an associated path group, for interrogating the state of said path; and, in response to said command,
- extracting path state and device state information from a path table associated with said device and at least said one path, said path state information distinguishing existence of any path group association with the interrogating system, and said device state information distinguishing any system affiliation or allegiance pertaining to said device;
- transmitting associated path state and device state information from said device to said system over said one path; said state information including a multi-byte identity function having a value which, if other than zero, indicates the identity of a specific system associated with said one path, or if zero indicates a reset state condition relative to said one path which effectively permits said one path to become associated with a newly identified system; a first path state function which indicates if said one path is or is not currently a member of an established path group containing one or more paths, and a second state function which indicates if said device has a current affiliation or allegiance either to the interrogating system or to another unidentified system.

7. A method of data communication in accordance with claim 1 wherein said device is accessible to other host systems different from said host system over paths not in said established path group, comprising:
- while said device does not have any affiliation or allegiance to said host system and said established group, establishing an affiliation or allegiance between said device and a said other host system via a path not in said established group; and
- modifying said established group while said affiliation or allegiance with said other system is in effect.

8. In a data processing network containing multiple central processing systems and devices capable of establishing path group associations useful for supporting path-independent data communications, an improved method of communication comprising:
- storing a path association defining channel command word (CCW) in one of said systems;
- storing an identifying expression in said one system in a memory location defined by said CCW, said expression uniquely identifying said one system;
- repeatedly transmitting a command function associated with said CCW, together with a representation of said stored identifying expression, separately over each path of a plurality of paths from said one system to one of said devices;
- in response to said command and identifying expression, causing said device to record grouped status indications relative to said plurality of paths and to record at least one representation of said identifying expression relative to said paths in a path map table associated with said device; said plurality of paths thereby being constituted as a group;
- establishing a reserve affiliation or other allegiance between said one system, said device and said path group, by conducting a controlling communication from said one system to said device over one path in said group;
- in response to said controlling communication, causing status for said reserve affiliation or other allegiance to be recorded in said device path table for each path in said group;
- thereafter conducting ordinary data and control communications between said one system and said device on the basis of said affiliation or other allegiance, over various paths in said group; and thereafter
- modifying said group as defined in said device path table while said affiliation or allegiance is in effect but inhibiting the modifying step if the device is transmitting data on one of the paths of the group, said modifying step including one of the steps of disbanding the path group, adding a path to the group, and resigning a path from the group.

9. The method of claim 8 wherein said group modifying step includes transmitting a path resigning command from said one system to said one device on one path in said group, comprising:
- in response to said resigning command causing erasure of any said recorded indications of grouped status and affiliated or allegiance status relative to said one path on which the resigning command has been transmitted;
- recording an ungrouped status indication relative to said one path; and
- requiring said one device thereafter to conduct ordinary data and control communications with said one system only on paths still in said group; i.e. only on paths other than said one resigned path.

10. The method of claim 8 wherein said modifying step includes transmitting a group disbanding command from said one system to said one device on one path in said group, comprising:
- in response to said disbanding command causing erasure of said indications of grouped status relative to each path in said group and erasure of said indications of affiliation or allegiance status relative to each said path except the path on which the disbanding command has been transmitted;
- recording ungrouped status indications relative to each of said paths; and requiring said one device thereafter to conduct ordinary data and control communications only with said one system and only on the path on which the disbanding command was presented.

11. The method of claim 8 wherein said modifying step includes presenting a path adding command from said one system to said one device over a path relative to which there are no recorded indications of grouped status or affiliated or allegiance status, comprising:

adding said path on which said path adding command appears as a new number of said group, by recording indications of grouped status and affiliated or allegiance status relative to said new member path in response to said command; and permitting said device to communicate with said system on an affiliated basis via said new member path and the other paths in said group.

* * * * *